United States Patent
Saeki et al.

(10) Patent No.: US 8,013,587 B2
(45) Date of Patent: Sep. 6, 2011

(54) DC/DC POWER SUPPLY CIRCUIT WITH A BYPASS CIRCUIT

(75) Inventors: Mitsuo Saeki, Kawasaki (JP); Kouichi Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 12/189,338

(22) Filed: Aug. 11, 2008

(65) Prior Publication Data

US 2009/0134861 A1   May 28, 2009

(30) Foreign Application Priority Data

Nov. 26, 2007   (JP) .................................. 2007-304143

(51) Int. Cl.
*G05F 5/08* (2006.01)
(52) U.S. Cl. ....................................................... 323/303
(58) Field of Classification Search .................. 323/268, 323/269, 272, 299, 303
See application file for complete search history.

(56) References Cited

U.S. PATENT DOCUMENTS

| 6,218,821 B1* | 4/2001 | Bisbee ........................... 323/299 |
| 2006/0006850 A1* | 1/2006 | Inoue et al. .................... 323/265 |
| 2008/0175025 A1* | 7/2008 | Yoon ............................... 363/15 |
| 2008/0315852 A1* | 12/2008 | Jayaraman et al. ............ 323/285 |
| 2009/0134861 A1* | 5/2009 | Saeki et al. .................... 323/299 |
| 2010/0080026 A1* | 4/2010 | Zhang .............................. 363/89 |
| 2010/0134078 A1* | 6/2010 | Murakami et al. ............ 323/271 |

FOREIGN PATENT DOCUMENTS

| EP | 1 111 492 | 6/2001 |
| JP | 2001-195136 | 7/2001 |

* cited by examiner

*Primary Examiner* — Jeffrey Sterrett
(74) *Attorney, Agent, or Firm* — Staas & Halsey LLP

(57) ABSTRACT

A power supply circuit includes: an input terminal; a DC voltage converter that converts a DC input voltage supplied to the input terminal into a DC output voltage; an output terminal that outputs the DC output voltage; a bypass circuit provided to the DC voltage converter between the input terminal and the output terminal; and a monitor control unit that monitors whether or not the DC input voltage satisfies a predetermined condition to be processed in the DC voltage converter, so as to connect the input terminal to the output terminal via the bypass circuit if the DC input voltage does not satisfy the predetermined condition.

6 Claims, 4 Drawing Sheets

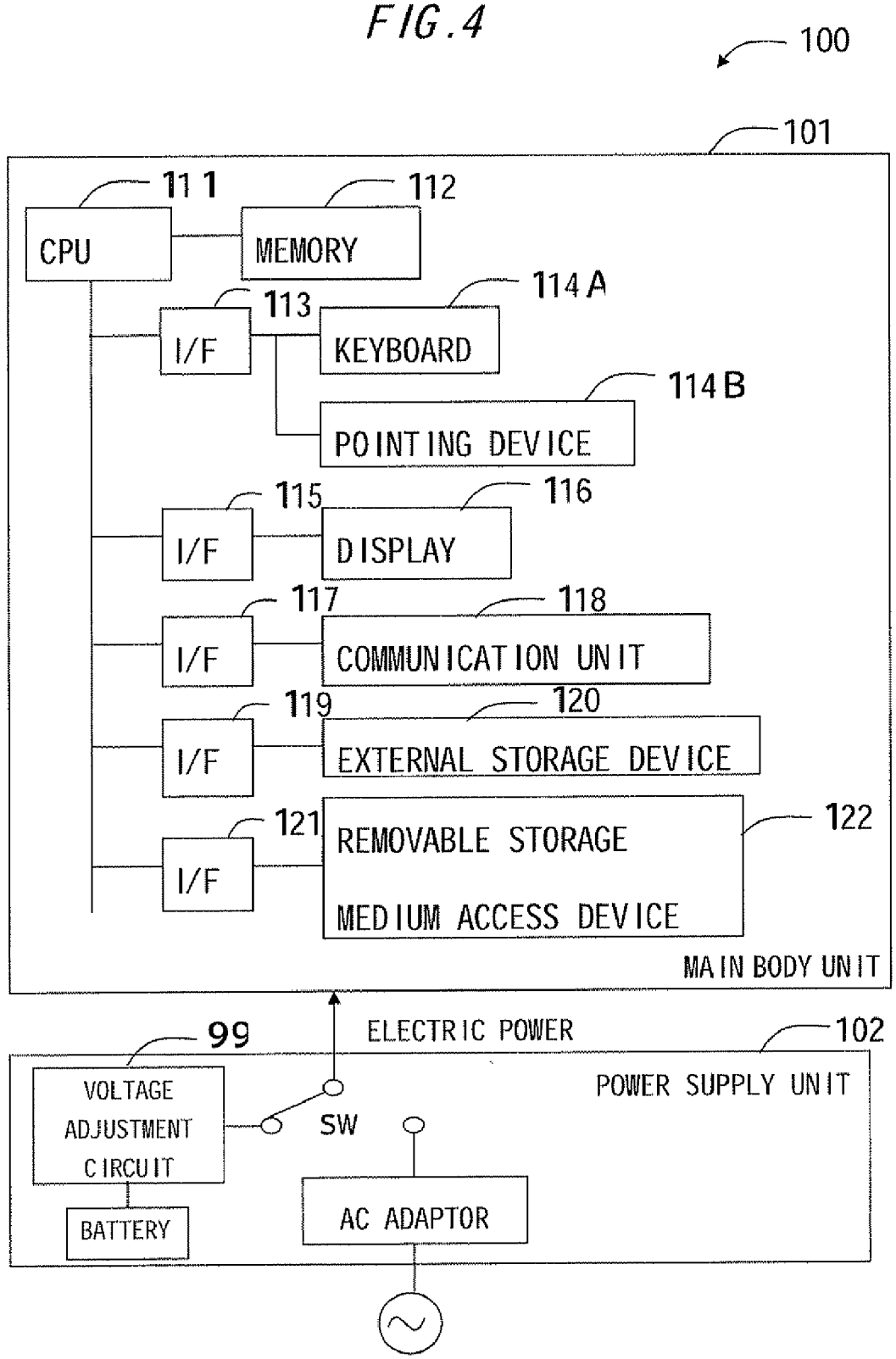

DC/DC POWER SUPPLY CIRCUIT WITH A BYPASS CIRCUIT

This application claims the benefit of Japanese Patent Application No. 2007-304143 filed on Nov. 26, 2007 in the Japanese Patent Office, the disclosure of which is herein incorporated in its entirety by reference.

BACKGROUND

The present invention relates to a power supply circuit.

Power supply circuits including various structures have been proposed conventionally (see Patent document 1 below, for instance).

For instance, a so-called DC-DC converter is usually made up of a chopper circuit that converts a direct current into a pulse waveform, and an LC circuit (circuit including inductance element and capacitor) that rectifies the pulse waveform. Further, the DC-DC converter adjusts its output voltage to a target value by adjusting a duty ratio of the pulse waveform.

However, the DC-DC converter including the structure as described above has a problem that it may not work normally unless an input voltage is higher than the target value of the output voltage by a predetermined limit value or more, depending on a voltage drop due to a switching device, other resistance components, or the like included in the chopper circuit, a conversion characteristic between the pulse waveform and the direct current, or the like.

Therefore, when a battery is used as a power source of the input voltage, for instance, in spite of the sufficient output of the battery, a case where the battery cannot be used may occur when the voltage is decreased below the predetermined limit value, because of the relationship between the voltage and the target value of the output voltage of the DC-DC converter. Therefore, there is a case where the battery should be replaced with a new one in a period of time shorter than a rated life of the battery.

[Patent document 1] Japanese Patent Application Laid-open No. 2001-195136

SUMMARY

As described above, since the conventional DC-DC converter requires that the input voltage should be higher than the target output voltage by the predetermined limit value or more, there may be a restriction for a power source of the input voltage. It is therefore an object to provide a voltage control technology for a power supply circuit using a DC-DC conversion, which can reduce such a restriction of the input voltage.

Thus, in order to solve the problems, a power supply circuit including the following structure is adopted. That is, this power supply circuit includes: an input terminal; a DC voltage converter converting a DC input voltage supplied to the input terminal into a DC output voltage; an output terminal outputting the DC output voltage; a bypass circuit provided to the DC voltage converter between the input terminal and the output terminal; and a monitor control unit monitoring whether or not the DC input voltage satisfies a predetermined condition to be processed by the DC voltage converter, and connecting the input terminal to the output terminal via the bypass circuit when the DC input voltage does not satisfy the predetermined condition.

This power supply circuit connects the input terminal to the output terminal via the bypass circuit that bypasses the DC voltage converter when the input voltage does not satisfy the predetermined condition. Therefore, even in a case where the input voltage does not satisfy the predetermined condition, and hence, a predetermined target output voltage cannot be obtained depending on the DC voltage converter, it is possible to make the output voltage closer to the predetermined target output voltage via the bypass circuit.

According to the power supply circuit described above, the restriction of the input voltage can be reduced so that the output voltage can be controlled.

BRIEF DESCRIPTION OF THE DRAWINGS

FIG. 4 is a diagram illustrating an example of a structure of an electronic apparatus.

DETAILED DESCRIPTION

Hereinafter, a power supply circuit according to a best mode (hereinafter, referred to as embodiment) will be described with reference to the attached drawings. A structure of the embodiment described below is an example, and disclosure power supply and electric apparatus are not limited to the structure of the embodiment.

Figure 1:
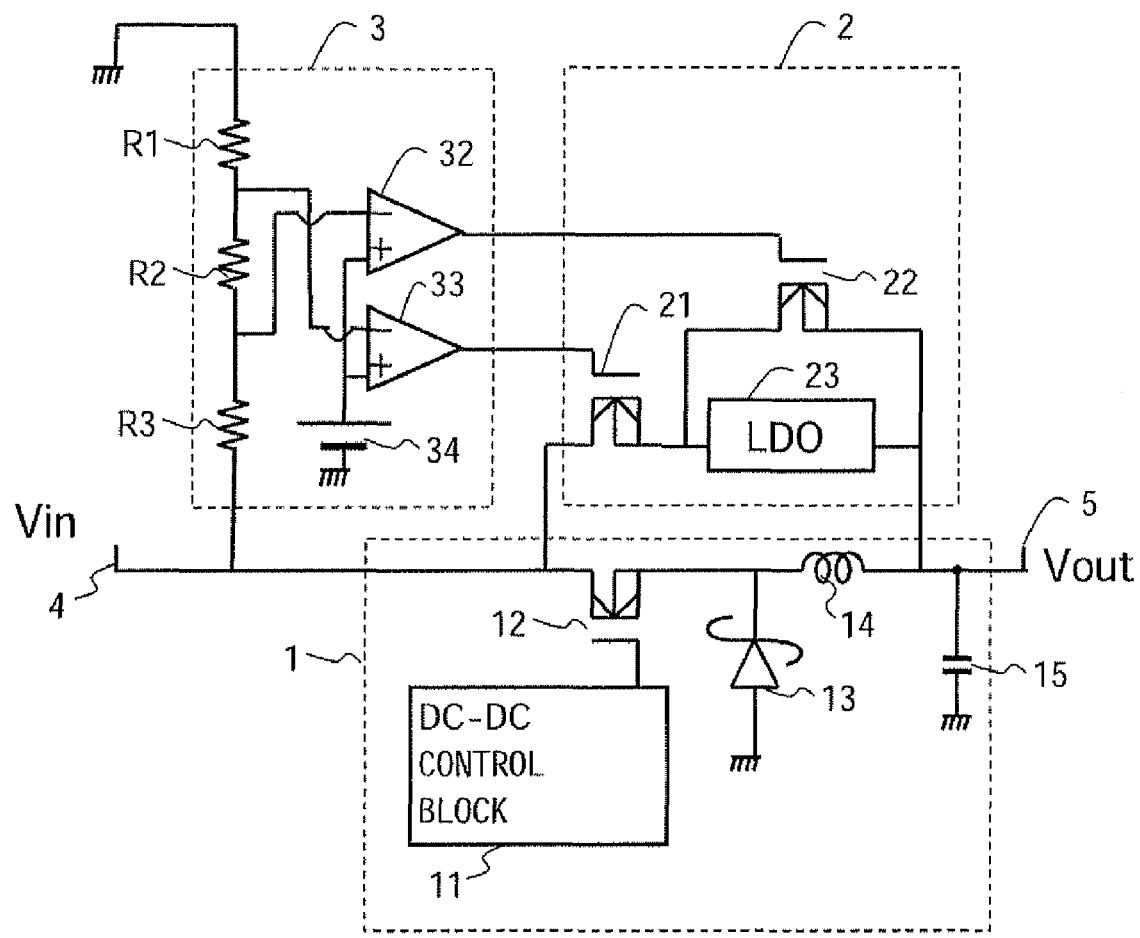
FIG. 1 is a diagram illustrating an example of a structure of a voltage adjustment circuit according to an embodiment.

FIG. 1 is a diagram illustrating an example of a voltage control circuit including a DC-DC converter. This voltage control circuit includes an input terminal 4, a DC-DC converter 1 that converts a DC input voltage supplied to the input terminal 4 into a target DC output voltage, an output terminal 5 that outputs the converted DC output voltage, a bypass circuit 2 that bypasses the DC-DC converter 1 so as to connect the input terminal 4 to the output terminal 5, and a monitor circuit 3 that monitors the DC input voltage. Hereinafter, the DC input voltage is simply referred to as an input voltage, and the DC output voltage is simply referred to as an output voltage.

The input terminal 4 is supplied with the input voltage Vin. The voltage control circuit provides a function of outputting the target output voltage Vout from the output terminal 5 with respect to the input voltage Vin.

The DC-DC converter 1 includes a transistor 12, a DC-DC control block 11 that makes the transistor 12 function as a chopper circuit by repeating turning on and off of the transistor 12, a diode 13 connected between the transistor 12 and the ground, an inductance element 14 connected in series with the transistor 12, and a capacitor 15 that is structured in parallel with the inductance element 14 and the output terminal 5, and has one end connected to the ground.

The DC-DC control block 11 supplies a control voltage to a gate of the transistor 12 so as to switch the transistor 12 between an ON state and an OFF state. Thus, the DC-DC control block 11 constitutes the chopper circuit together with the transistor 12 so as to generate a rectangular wave from the input voltage Vin.

The DC-DC control block 11 includes, for instance, a multivibrator, oscillator circuit or the like that generates a rectangular wave at a predetermined cycle or a predetermined duty ratio. The cycle or the duty ratio of the DC-DC control block 11 can be controlled by adjusting a gain of an amplifier constituting the multivibrator or the oscillator circuit, or a resistor or a capacitor constituting a charge and discharge circuit. Such a structure of the DC-DC control block 11 is known widely, so descriptions thereof will be omitted.

The diode 13 supplies electric current to an LC circuit when the transistor 12 is turned off. The diode 13 is called a flywheel diode.

The inductance element 14 and the capacitor 15 constitute a low pass filter, which generates a DC voltage from the rectangular wave. Then, the output voltage Vout is controlled by the duty ratio of the rectangular wave.

The bypass circuit 2 includes a transistor 21, a low drop out voltage regulator (LDO) 23 connected in series with the transistor 21 so as to adjust the voltage from the transistor 21 and output it to the output terminal 5, and a transistor 22 connected in parallel with the LDO 23 so as to output the voltage from the transistor 21 to the output terminal 5 without the adjustment.

The transistor 21 becomes turned on or off when its gate voltage is controlled. When the transistor 21 is turned on, the transistor 21 bypasses the DC-DC converter 1 so that the input voltage Vin is supplied to the LDO 23.

The LDO 23 is, for instance, a constant voltage circuit (linear regulator) that is controlled by feedback. The constant voltage circuit can be made up of a transistor that outputs an input voltage at a predetermined ratio (usually called adjustment valve) and a circuit that feeds back the output voltage to the transistor to control the output voltage to be a constant value, for instance. The LDO 23 is less restrictive than the DC-DC converter about the input voltage with respect to the output voltage Vout. This is because of the circuit structure in which a constant ratio of the input voltage is delivered by the transistor as the output voltage. Therefore, it is sufficient that the input voltage Vin is higher than the output voltage Vout by the voltage drop $\Delta V1$ in the LDO 23.

$$Vin >= Vout + \Delta V1 \quad \text{(Expression 1)}$$

where $\Delta V1$ (corresponding to decrease between input and output voltages) is determined by characteristics of the transistor that works as the adjustment valve in the LDO 23.

On the other hand, in the case of the DC-DC converter 1 shown in FIG. 1, for instance, the output voltage is controlled by the duty ratio of the rectangular wave. Therefore, the input voltage Vin is required to be still higher than that of the LDO 23. It is because that, comparing with the case where the adjustment valve outputs a constant ratio of the input voltage to the output terminal 5, it is difficult to operate at a duty ratio close to 100% (or 0%) in the case where the input voltage is once converted into a rectangular wave and is further converted into a direct current by the LC circuit. Therefore, in order to obtain a predetermined output voltage Vout, a predetermined limit value of margin is required for the input voltage and further for the rectangular wave amplitude.

Specifically, in this case, the required input voltage Vin is expressed by Expression 2 below.

$$Vin >= Vout + \Delta V2 \text{ (here, } \Delta V2 > \Delta V1) \quad \text{(Expression 2)}$$

where $\Delta V2$ (corresponding to decrease between input and output voltages) is determined by characteristics of the transistor 12, the diode 13, the inductance element 14 and the capacitor 15, and further by the control circuit that controls them (because of characteristics (performances) of boost-up circuit that turns on transistor or that the duty ratio cannot be 100% for safety).

The transistor 22 is turned on or off when its gate voltage is controlled. When the transistor 22 is turned on, the transistor 22 bypasses the LDO 23 so as to deliver an output of the transistor 21 to the output terminal 5. The voltage drop in the case where the transistor 22 is turned on is smaller than the voltage drop $\Delta V1$ due to the LDO 23. Therefore, when both of the transistors 21 and 22 are turned on, the input voltage Vin is substantially delivered to the output terminal 5 directly.

The monitor circuit 3 (corresponding to monitor control unit) is disposed between the input terminal 4 and the ground, and includes resistors R1, R2 and R3 connected in series with each other, a reference voltage generating unit 34 that generates a reference voltage Vs, comparators 32 and 33 that compare the reference voltage Vs with the input voltage divided by the resistors R1, R2 and R3. The comparator 33 corresponds to a first comparator while the comparator 32 corresponds to a second comparator.

In FIG. 1, the reference voltage generating unit 34 is indicated by a symbol of a battery. However, the reference voltage generating unit 34 is not limited to the battery. For instance, the reference voltage generating unit 34 may be obtained by dividing a power supply voltage supplied to the system. Alternatively, the reference voltage generating unit 34 may be made up of a combination of voltage regulating diodes.

The comparator 33 compares a divided voltage V1 given by Expression 3 below with the reference voltage Vs. Then, the comparator 33 turns on or off the transistor 21 in accordance with a result of the comparison. Here, it is supposed that the reference symbols R1, R2 and R3 of FIG. 1 also indicate their resistance values.

$$V1 = Vin \times R1/(R1 + R2 + R3) \quad \text{(Expression 3)}$$

In addition, the comparator 32 compares a divided voltage V2 given by Expression 4 below with the reference voltage Vs. Then, the comparator 32 turns on or off the transistor 22 in accordance with a result of the comparison. Each of the divided voltages V1 and V2 corresponds to the detected voltage.

$$V2 = Vin \times (R1 + R2)/(R1 + R2 + R3) \quad \text{(Expression 4)}$$

First, when the divided voltage V1 is higher than the reference voltage Vs, the comparator 33 turns off the transistor 21. In this case, the input voltage Vin is controlled via the DC-DC converter 1. In other words, an output of the DC-DC converter 1 becomes the output voltage Vout.

Next, it is supposed that the divided voltage V1 is lower than the reference voltage Vs, and the divided voltage V2 is higher than the reference voltage Vs. In this case, the comparator 33 turns on the transistor 21. In contrast, the comparator 32 turns off the transistor 22. In this case, the input voltage Vin is controlled via the LDO 23. In other words, an output of the LDO 23 becomes the output voltage Vout.

In addition, when the divided voltage V2 is lower than the reference voltage Vs, the comparator 32 turns on the transistor 22. In this case, the divided voltage V1 is lower than the reference voltage Vs as understood from Expression 3 and Expression 4. Therefore, the comparator 33 maintains the ON state of the transistor 21. In this case, the input voltage Vin is substantially delivered to the output terminal 5 as it is via the transistors 21 and 22.

As described above, when the input voltage Vin that is permissible as an input voltage with respect to the DC-DC converter 1 is lower than the limit value (Vout+$\Delta V2$) that is given by Expression 2, the divided voltage V1 may be set so as to be lower than the reference voltage Vs. In other words, a relationship between the limit value V1lim of the divided voltage V1 and the reference voltage Vs can be expressed by Expression 5 below derived from Expression 2 and Expression 3, $$Vs > V1lim = (Vout + \Delta V2) \times R1/(R1 + R2 + R3) \quad \text{(Expression 5)}$$

when the divided voltage V1 is at the level higher than or equal to V1lim, the input voltage Vin is to be at the first level.

In addition, when the input voltage Vin that is permissible as an input voltage with respect to the LDO 23 is lower than the limit value (Vout+ΔV1) given by Expression 1, the divided voltage V2 may be set so as to be lower than the reference voltage Vs. In other words, a relationship between the limit value V2lim of the divided voltage V2 and the reference voltage Vs can be expressed by Expression 6 below derived from Expression 1 and Expression 4.

$$Vs > V2\text{lim} = (Vout+\Delta V1) \times (R1+R2)/(R1+R2+R3) \quad \text{(Expression 6)}$$

when the divided voltage V2 is at the level higher than or equal to V2lim, the input voltage Vin is to be at the second level. When values of R1, R2 and R3 are set so that the relationships of Expression 5 and Expression 6 are satisfied, the input voltage Vin is controlled by the DC-DC converter 1 so that the output voltage Vout is generated in the case where the input voltage Vin is sufficiently high and the DC-DC converter 1 can operate normally. In addition, even if the DC-DC converter 1 cannot operate normally, when the LDO 23 can operate normally, the input voltage Vin is controlled by the LDO 23 so that the output voltage Vout is generated. In addition, when the output voltage Vout cannot be generated by the LDO 23, the input voltage Vin is substantially delivered to the output terminal 5 as it is via the transistors 21 and 22.

Therefore, according to this voltage control circuit, it is possible to increase possibility of using a battery until its output is lowered to a state close to a limit of life when the input voltage Vin is supplied from the battery, for instance.

<Variation>

In the embodiment described above, the LDO 23 and the transistor 22 are disposed in parallel as the bypass circuit 2 while two comparators are disposed as the monitor circuit 3. Then, when the input voltage is lower than a permissible value of the DC-DC converter 1, the input voltage is first adjusted via the LDO 23. In addition, when the input voltage is further lowered, the input terminal 4 is connected to the output terminal 5 via the transistors 21 and 22.

Figure 2:
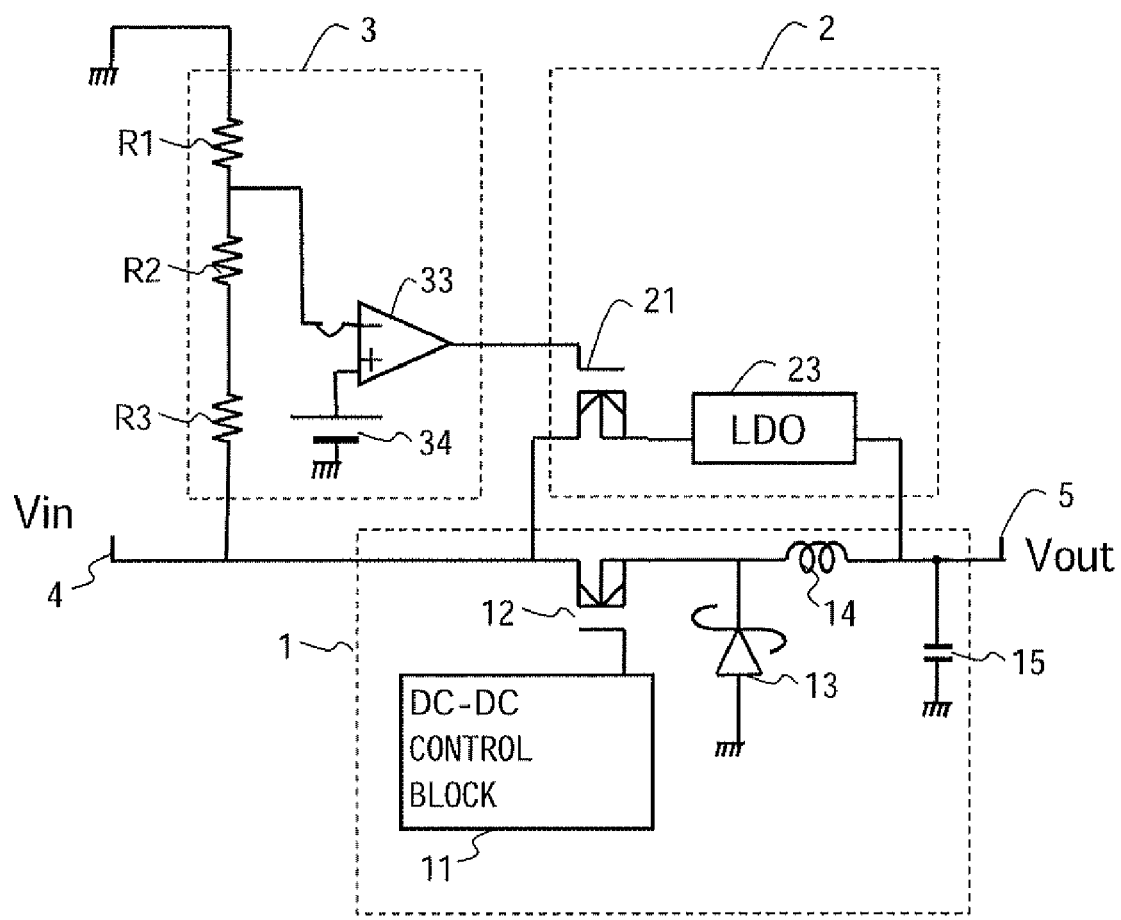
FIG. 2 is a diagram illustrating an example of a structure of a voltage adjustment circuit according to Variation 1.

However, it is not always necessary to adopt the multistage structure described above. For instance, it is possible to adopt a structure by using the DC-DC converter 1 and the LDO 23 as shown in FIG. 2. In this case, however, the input voltage Vin that is lower than an operating limit of the LDO 23 cannot be used.

Figure 3:
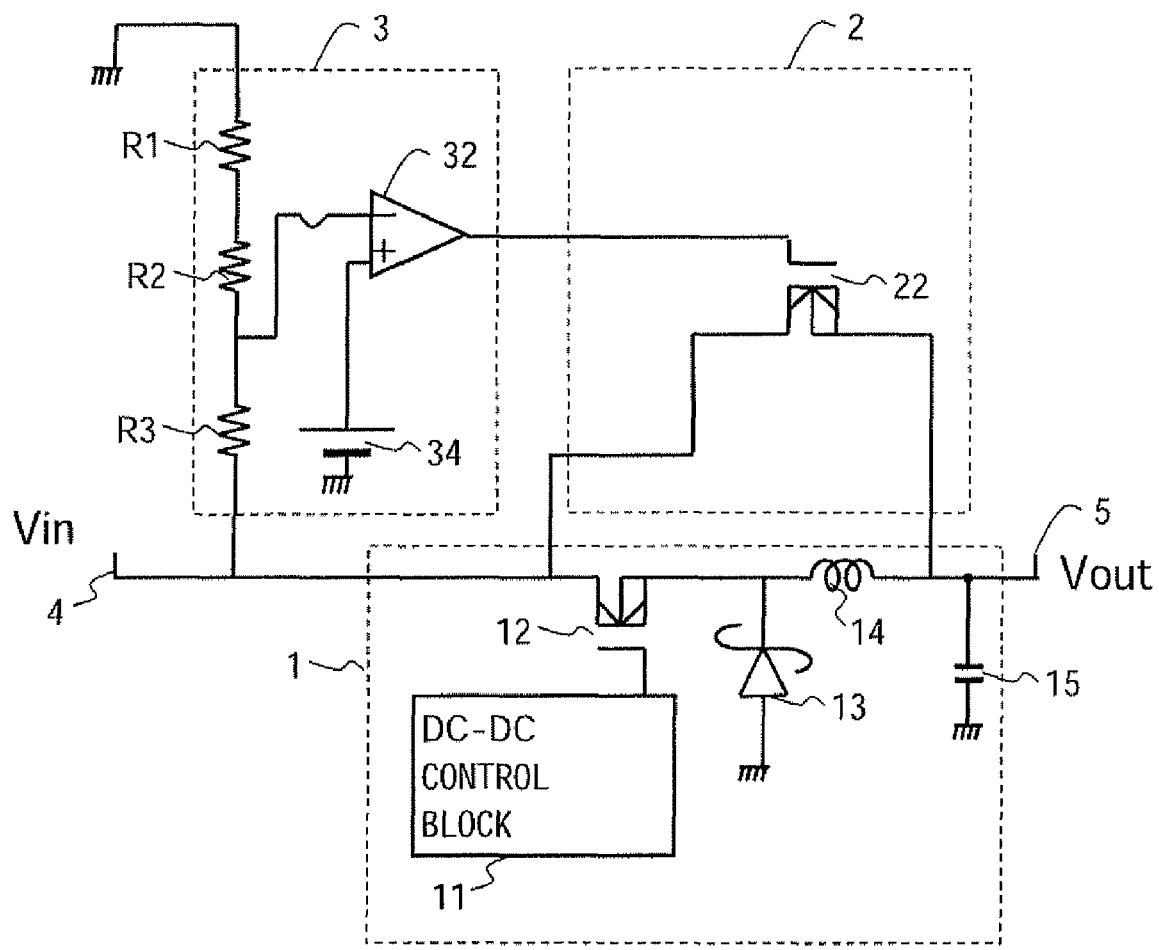
FIG. 3 is a diagram illustrating an example of a structure of a voltage adjustment circuit according to Variation 2.

In addition, it is also possible to adopt a structure of the voltage control circuit by using the DC-DC converter 1 and the transistor 22 without the LDO 23 as shown in FIG. 3. In this case, however, the input voltage Vin that is lower than an operating limit of the DC-DC converter 1 is not adjusted and is substantially delivered to the output terminal 5 as it is via the transistor 22.

In addition, the chopper type converter is described above as the DC-DC converter, and it is needless to say that the same effect can be obtained even if a structure in which the diode 13 is an FET, i.e., a synchronous rectifying converter is adopted.

<Other Variations>

FIG. 4 illustrates an example of an electronic apparatus 100 including a voltage adjustment circuit 99. The electronic apparatus 100 includes a main body unit 101 (corresponding to power receiving unit) and a power supply unit 102.

The main body unit 101 includes a CPU 111 that executes a program, a memory 112 that stores the program executed by the CPU 111 or data processed by the CPU 111, a keyboard 114A connected to the CPU 111 via an interface 113, and a pointing device 114B. The pointing device 114B is a mouse, a trackball, a touch panel, a flat device including an electrostatic sensor, or the like.

In addition, the main body unit 101 has a display 116 connected via an interface 115. The display 116 displays information input from the keyboard 114A or data processed by the CPU 111. The display 116 is a liquid crystal display or an electroluminescence (EL) panel, for instance.

In addition, the main body unit 101 has a communication unit 118 connected via an interface 117. The communication unit 118 is a local area network (LAN) board or the like.

In addition, the main body unit 101 has an external storage device 210 connected via an interface 119. The external storage device 120 is a hard disk drive, for instance. In addition, the main body unit 101 has a removable storage medium access device 22 connected via an interface 121. The removable storage medium is a compact disk (CD), a digital versatile disk (DVD), a flash memory card, or the like, for instance.

This main body unit 101 is supplied with electric power from the power supply unit 102. The power supply unit 102 is connected via a switch SW to a voltage adjustment circuit 99 (corresponding to power supply circuit) and an AC adaptor. The power supply unit 102 can supply electric power to the main body unit 101 from one of the voltage adjustment circuit 99 and the AC adaptor. The voltage adjustment circuit 99 has the structure as described above with reference to FIGS. 1 to 3. In the example shown in FIG. 4, the voltage adjustment circuit 99 converts a voltage from a battery (corresponding to power supply), for instance. The power supply can be a normal battery or a secondary battery.

As an example of the electronic apparatus described above, there is a notebook type (also called book type or laptop type) personal computer, an information processing apparatus such as a personal digital assistant (PDA), an imaging apparatus such as a digital camera or a video camera, a communication device such as a mobile phone or a PHS mobile phone, a receiver such as an analog or a digital television set, a vehicle-installed apparatus, a measuring instrument equipped with a sensor, or the like.

What is claimed is:

1. A power supply circuit, comprising:
   an input terminal;
   a DC voltage converter converting a DC input voltage supplied to the input terminal into a DC output voltage;
   an output terminal outputting the DC output voltage;
   a bypass circuit bypassing the DC voltage converter between the input terminal and the output terminal; and
   a monitor control unit monitoring whether or not the DC input voltage satisfies a predetermined condition to be processed by the DC voltage converter, and connecting the input terminal to the output terminal via the bypass circuit when the DC input voltage does not satisfy the predetermined condition,
   wherein the bypass circuit including a voltage adjustment circuit, in which a voltage reduction across the voltage adjustment circuit is smaller than a voltage reduction across the DC voltage converter.

2. The power supply circuit according to claim 1,
   the monitor control unit including:
   a reference voltage terminal outputting a reference voltage; and
   a comparing unit comparing a detected voltage obtained based on the DC input voltage with the reference voltage; and
   the bypass circuit including a switch to be turned off when it is determined that the detected voltage is higher than the reference voltage by the comparing unit and to be turned on when it is determined that the detected voltage is lower than the reference voltage by the comparing unit.

3. The power supply circuit according to claim 1, wherein the monitor control unit comprising:
- a first comparator determining whether or not the DC input voltage is higher than or equal to a first level; and
- a second comparator determining whether or not the DC input voltage is higher than or equal to a second level that is lower than the first level;

the bypass circuit including a parallel circuit in which the voltage adjustment circuit including a smaller decrease between an input voltage and an output voltage than the DC voltage converter and a bypass switch including a smaller decrease between an input voltage and an output voltage than the voltage adjustment circuit are connected to each other in parallel, and the monitor control unit delivering the DC input voltage to the output terminal via the voltage adjustment circuit when the DC input voltage is not higher than or equal to the first level and is higher than or equal to the second level, and delivering the DC input voltage to the output terminal via the bypass switch when the DC input voltage is not higher than or equal to the second level.

4. An electronic apparatus, comprising:
a power supply circuit, including:
- an input terminal capable of being connected to a power supply;
- a DC voltage converter converting a DC input voltage supplied to the input terminal into a DC output voltage;
- an output terminal outputting the DC output voltage;
- a bypass circuit bypassing the DC voltage converter between the input terminal and the output terminal; and
- a monitor control unit monitoring whether or not the DC input voltage satisfies a predetermined condition to be processed in the DC voltage converter, and connecting the input terminal to the output terminal via the bypass circuit when the DC input voltage does not satisfy the predetermined condition; and a power receiving unit being supplied with electric power from the power supply circuit connected to the power supply, and including at least one component driven by the supplied electric power, wherein the bypass circuit including a voltage adjustment circuit, in which a voltage reduction across the voltage adjustment circuit is smaller than a voltage reduction across the DC voltage converter.

5. The electronic apparatus according to claim 4, wherein the monitor control unit comprising:
- a first comparator determining whether or not the DC input voltage is higher than or equal to a first level; and
- a second comparator determining whether or not the DC input voltage is higher than or equal to a second level that is lower than the first level;

the bypass circuit including a parallel circuit in which the voltage adjustment circuit including a smaller decrease between an input voltage and an output voltage than the DC voltage converter and a bypass switch including a smaller decrease between an input voltage and an output voltage than the voltage adjustment circuit are connected to each other in parallel, and the monitor control unit delivering the DC input voltage to the output terminal via the voltage adjustment circuit when the DC input voltage is not higher than or equal to the first level and is higher than or equal to the second level, and delivering the DC input voltage to the output terminal via the bypass switch when the DC input voltage is not higher than or equal to the second level.

6. The electronic apparatus according to claim 4, wherein the monitor control unit including:
- a reference voltage terminal outputting a reference voltage; and
- a comparing unit comparing a detected voltage obtained based on the DC input voltage with the reference voltage; and the bypass circuit including a switch to be turned off when it is determined that the detected voltage is higher than the reference voltage by the comparing unit and to be turned on when it is determined that the detected voltage is lower than the reference voltage by the comparing unit.

* * * * *